(12) United States Patent
Bererton et al.

(10) Patent No.: US 7,702,608 B1
(45) Date of Patent: Apr. 20, 2010

(54) GENERATING MOTION RECOGNIZERS FOR ARBITRARY MOTIONS FOR VIDEO GAMES AND TUNING THE MOTION RECOGNIZERS TO THE END USER

(75) Inventors: Curt Bererton, Burlingame, CA (US);
Daniel Dobson, Atherton, CA (US);
John Funge, Sunnyvale, CA (US);
Charles Musick, Belmont, CA (US);
Stuart Reynolds, Palo Alto, CA (US);
Xiaoyuan Tu, Sunnyvale, CA (US); Ian Wright, Mountain View, CA (US); Wei Yen, Los Altos Hills, CA (US)

(73) Assignee: AiLive, Inc., Mountain View, CA (US)

( * ) Notice: Subject to any disclaimer, the term of this patent is extended or adjusted under 35 U.S.C. 154(b) by 911 days.

(21) Appl. No.: 11/486,997

(22) Filed: Jul. 14, 2006

(51) Int. Cl.
*G06F 17/00* (2006.01)
*G06N 5/02* (2006.01)
*A63F 9/24* (2006.01)
*A63F 13/00* (2006.01)
*G06F 19/00* (2006.01)

(52) U.S. Cl. .......................................... 706/46; 463/37
(58) Field of Classification Search .................... 706/46
See application file for complete search history.

(56) References Cited

U.S. PATENT DOCUMENTS

| | | |
|---|---|---|
| 5,778,157 A | 7/1998 | Oatman et al. |
| 5,995,955 A | 11/1999 | Oatman et al. |
| 6,192,338 B1 | 2/2001 | Haszto et al. |
| 6,216,014 B1 | 4/2001 | Proust et al. |
| 6,363,384 B1 | 3/2002 | Cookmeyer, II et al. |
| 6,389,405 B1 | 5/2002 | Oatman et al. |
| 6,425,582 B1 | 7/2002 | Rosi |

(Continued)

FOREIGN PATENT DOCUMENTS

WO    WO 2006/014560 A2    2/2006

(Continued)

OTHER PUBLICATIONS

Kjeldson, Rick and John Kender "Toward the Use of Gesture in Traditional User Interfaces" Proceedings of the Second International Conference on Automatic Face and Gesture Recognition. Oct. 14-16, 1996, pp. 151-156.*

(Continued)

*Primary Examiner*—David R Vincent
*Assistant Examiner*—Ben M Rifkin
(74) *Attorney, Agent, or Firm*—Joe Zheng

(57) ABSTRACT

Generating motion recognizers from example motions, without substantial programming, without limitation to any fixed set of well-known gestures, and without limitation to motions that occur substantially in a plane, or are substantially predefined in scope. From example motions for each class of motion to be recognized, a system automatically generates motion recognizers using machine learning techniques. Those motion recognizers can be incorporated into an end-user application, with the effect that when a user of the application supplies a motion, those motion recognizers will recognize the motion as an example of one of the known classes of motion. Motion recognizers can be incorporated into an end-user application; tuned to improve recognition rates for subsequent motions to allow end-users to add new example motions.

66 Claims, 6 Drawing Sheets

Tuning setup.

U.S. PATENT DOCUMENTS

| | | |
|---|---|---|
| 6,467,085 B2 | 10/2002 | Larsson |
| 6,477,553 B1 | 11/2002 | Druck |
| 6,561,811 B2 | 5/2003 | Rapoza et al. |
| 6,636,860 B2 | 10/2003 | Vishnubhotla |
| 6,640,231 B1 | 10/2003 | Andersen et al. |
| 6,892,349 B2 | 5/2005 | Shizuka et al. |
| 7,054,928 B2 | 5/2006 | Segan et al. |
| 2002/0165839 A1 | 11/2002 | Taylor et al. |
| 2003/0041040 A1 | 2/2003 | Bertrand et al. |
| 2003/0084015 A1 | 5/2003 | Beams et al. |
| 2004/0010505 A1 | 1/2004 | Vishnubhotla |
| 2006/0001545 A1* | 1/2006 | Wolf .................. 340/573.1 |
| 2006/0036398 A1 | 2/2006 | Funge et al. |

FOREIGN PATENT DOCUMENTS

WO    WO 2006/015234 A2    2/2006

OTHER PUBLICATIONS

Welch Greg and Eric Foxlin. "Motion Tracking: No Silver Bullet but a Respectable Arsenal." Computer Graphics and Applications, IEEE vol. 22, Issue 6. Nov.-Dec. 2002 pp. 24-38.*

Statsoft. "Neural Networks" Feb. 13, 1998, Verified by Wayback Machine.*

Teknomo, Kardi. "K Nearest Neighbors Tutorial, Strengths and Weakness, Numerical Example, How KNN works". Oct. 16, 2005. Verified by wayback machine.*

EHow. "How to Play Simon Says" .Verified by wayback machine to Jun. 29, 2004.*

Kwon, Doo Young and Markus Gross. "Combining Body Sensors and Visual Sensors for Motion Training" ACM International Conference Proceeding Series; vol. 265; Proceedings of the 2005 ACM SIGCHI International Conference on Computer entertainment technology. Jun. 15-17, 2005.*

* cited by examiner

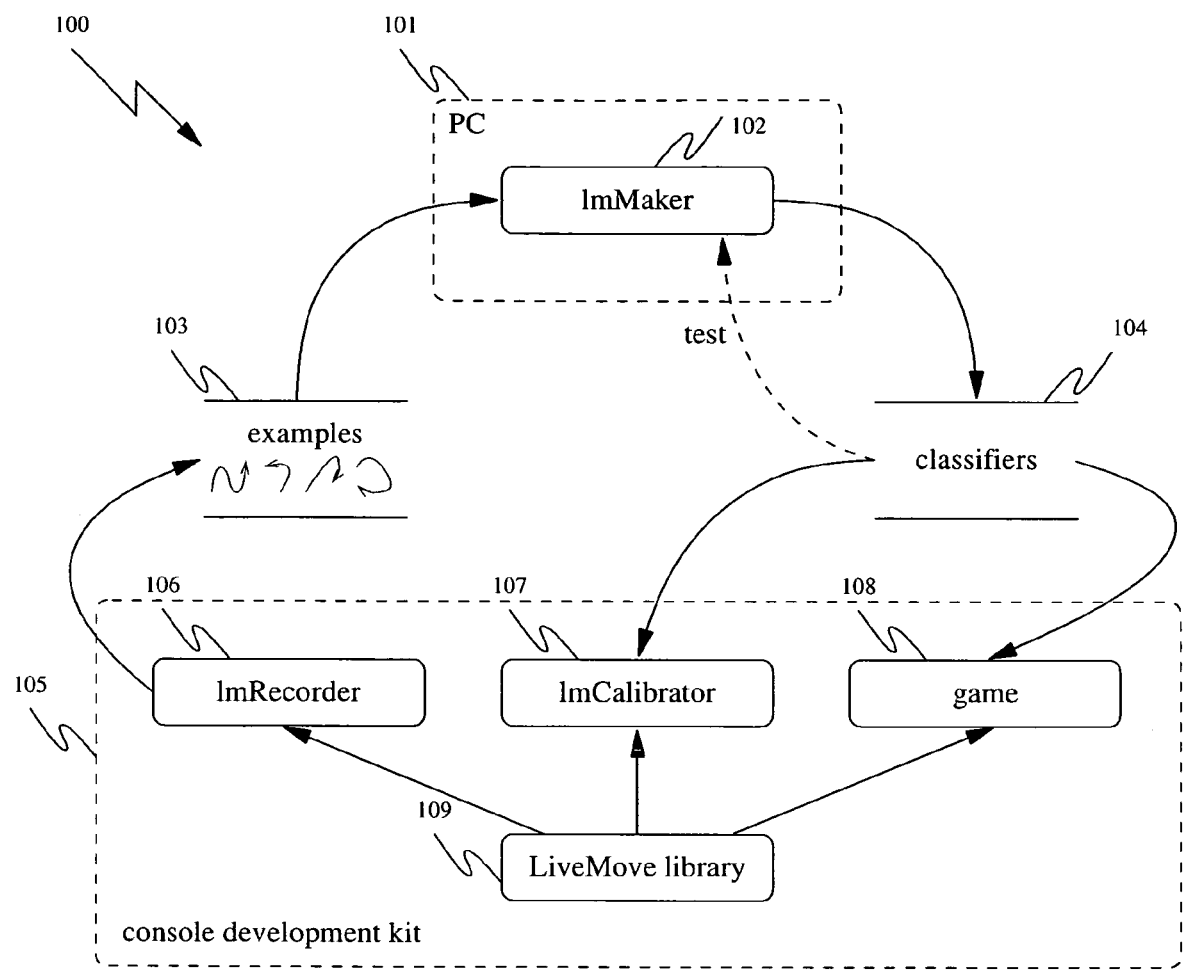
Figure 1: Overview.

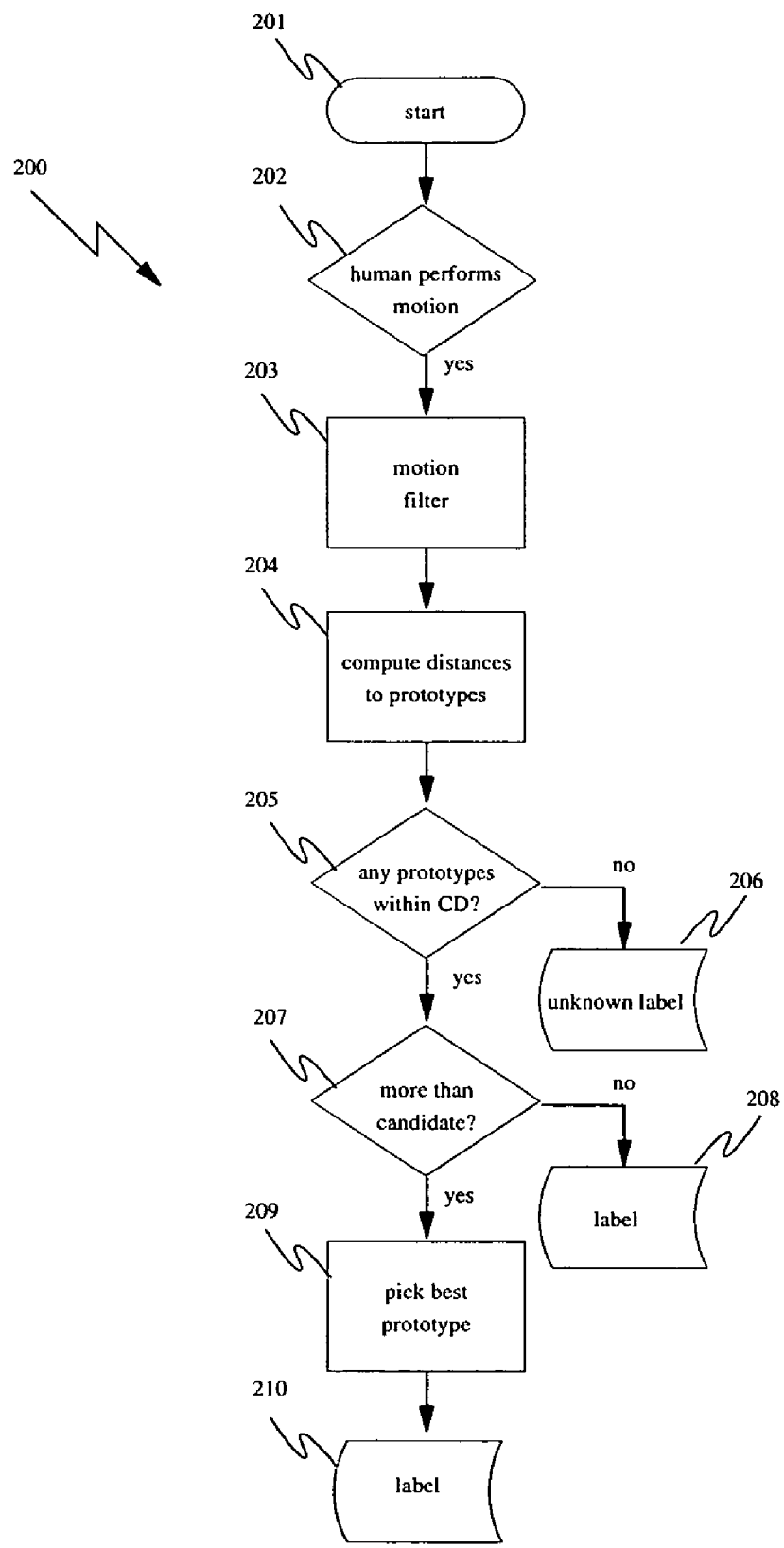
Figure 2: Classification.

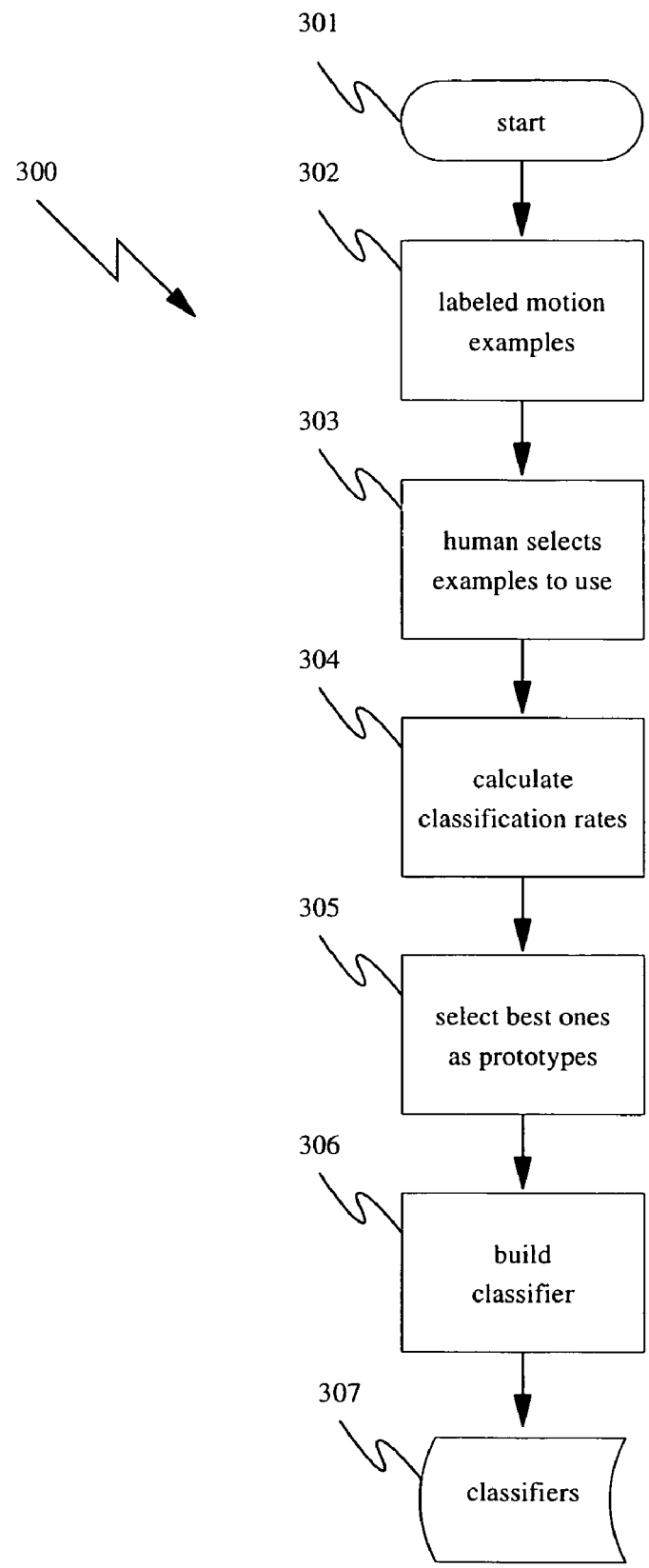
Figure 3: Generating a Classifer.

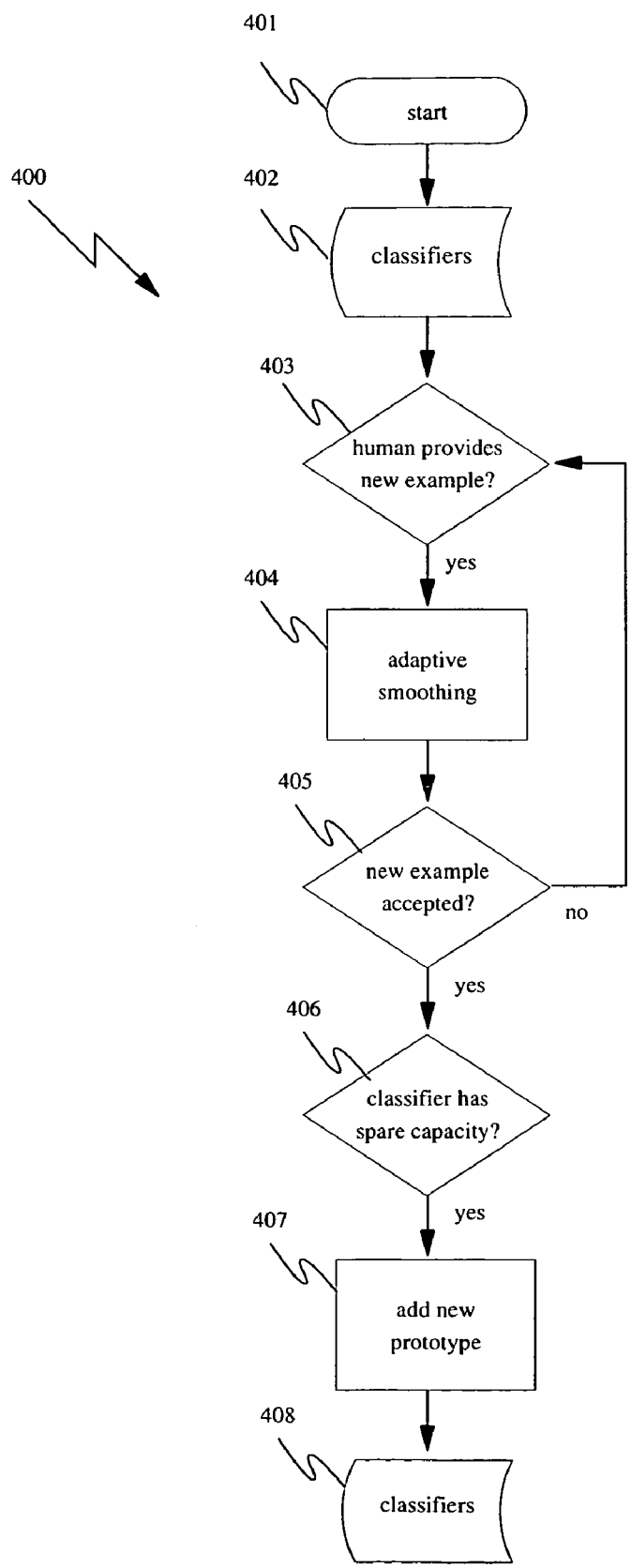
Figure 4: Tuning a Classifier.

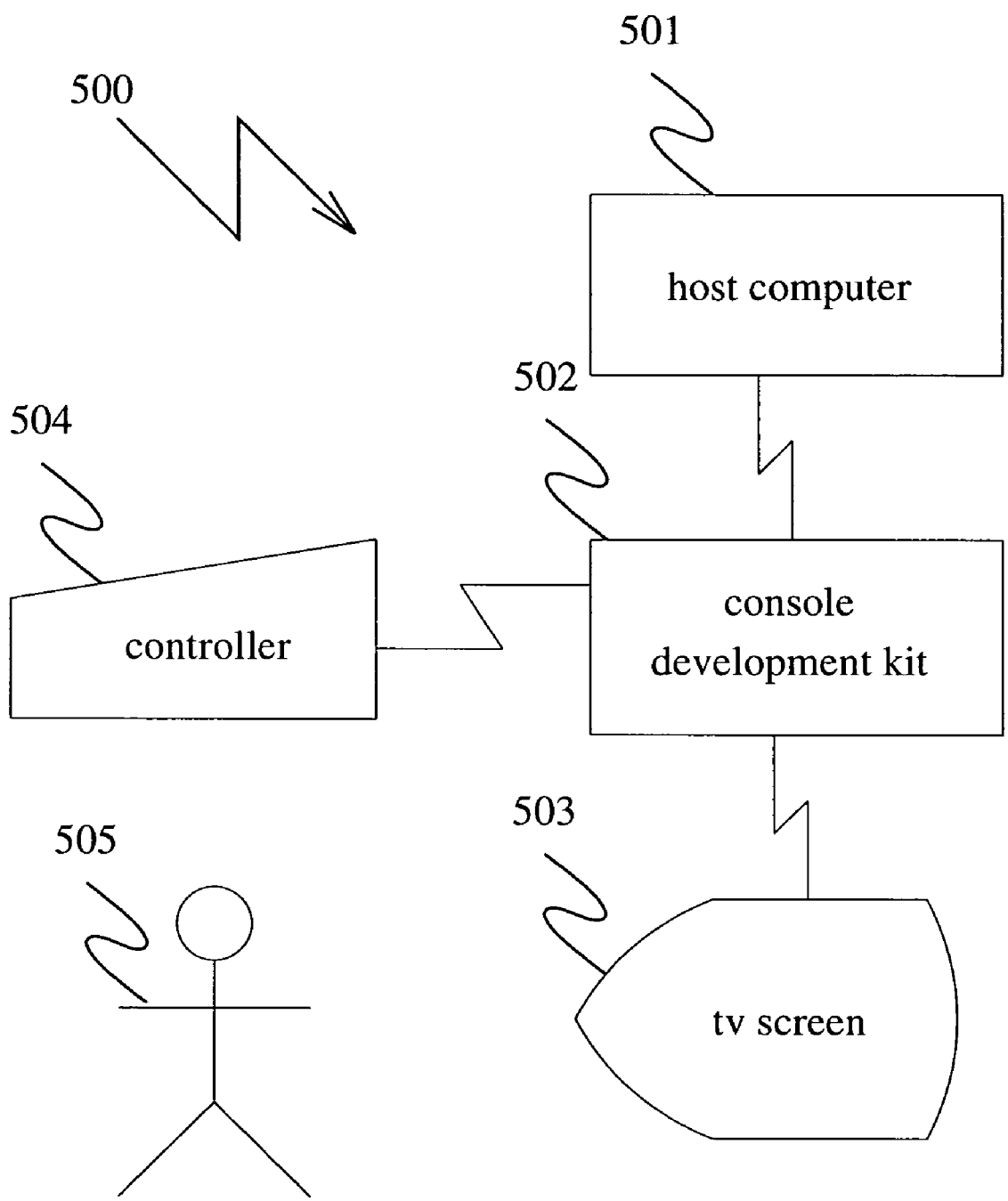
Figure 5: Typical Setup.

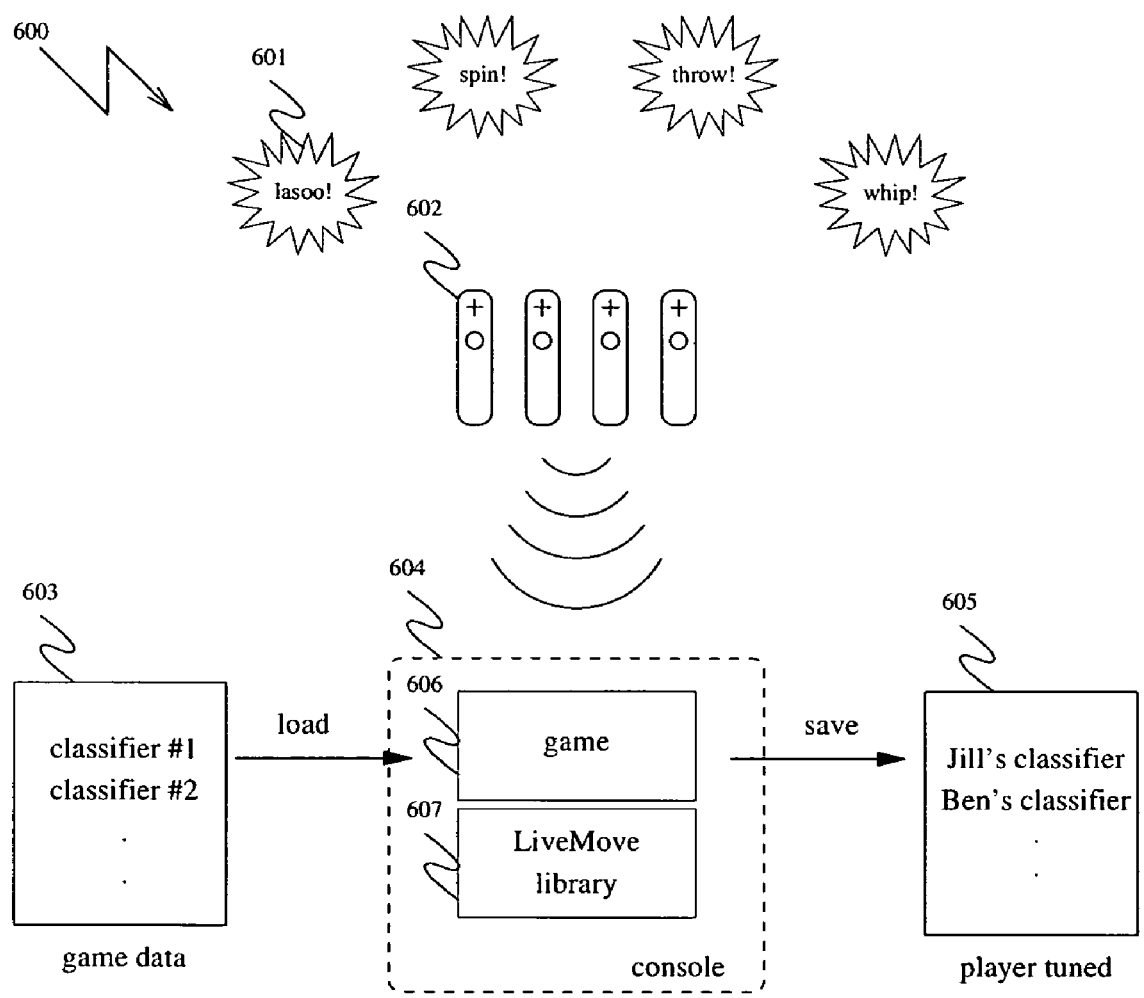
Figure 6: Tuning setup.

GENERATING MOTION RECOGNIZERS FOR ARBITRARY MOTIONS FOR VIDEO GAMES AND TUNING THE MOTION RECOGNIZERS TO THE END USER

BACKGROUND OF THE INVENTION

1. Field of the Invention

The invention relates to machine learning, especially in the context of generating motion recognizers from example motions; in some embodiments, a set of generated motion recognizers can be incorporated into end-user applications, with the effect that those applications are capable of recognizing motions.

2. Related Art

Writing program code to recognize whether a supplied motion is an example of one of an existing set of known motion classes, or motion types, can be difficult. This is because the representation of a motion can often be counter-intuitive. For example, if a motion is created with a device containing at least one accelerometer, relating the resulting data to an intuitive notion of the motion performed can be extremely difficult with known techniques. The problem is difficult because the same motion can be quite different when performed by different people, or even by the same person at different times. In addition the motion recording device might introduce measurement errors, or noise, that can make it harder to recognize a motion.

Handwriting recognition (HWR) is a special case of recognizing motions. What makes it a special case is that the set of motion classes is known in advance and all the motions are known ahead of time to be performed in a two-dimensional plane. For example, in English there are 26 lowercase letters of the alphabet that are written on a flat writing surface. Real world HWR recognition systems may include support for uppercase letters, punctuation, numerals and other gestures such as cut and paste. At least some machine learning approaches to HWR are known and widely used, but they do not solve the more general problem of generating motion recognizers in response to example motions.

At least some techniques for gesture recognition of limited symbols in computer games are also known. For example, various spell-casting games allow players to perform gestures that are recognized as invocations for particular spells. However, the set of gestures is fixed in advance by using a pre-programmed recognizer. Moreover, a movement is usually restricted to movement in a plane.

SUMMARY OF THE INVENTION

The invention provides a way for developers and users to generate motion recognizers from example motions, without substantial programming.

The invention is not limited to recognizing a fixed set of well-known gestures, as developers and users can define their own particular motions. For example, developers and users could choose to give example motions for their own made-up alphabet that is unlike any known alphabet and the invention will generate a motion recognizer for that unique alphabet. The invention is also not limited to motions that occur substantially in a plane, or are substantially predefined in scope.

The invention allows a developer to generate motion recognizers by providing one or more example motions for each class of motions that must be recognized. Machine learning techniques are then used to automatically generate one or more motion recognizers from the example motions. Those motion recognizers can be incorporated into an end-user application, with the effect that when a user of the application supplies a motion, those motion recognizers will recognize the motion as an example of one of the known classes of motion. In the case that the motion is not an example of a known class of motion, those motion recognizers can collectively recognize that fact by responding that the motion is "unknown".

In another use of the invention, the ability to tune a motion recognizer can be incorporated into an end-user application. In this case, not just the application developers, but also any users of the end-user application can add their own new example motions. The recognizer can then be tuned to improve recognition rates for subsequent motions from those users.

In another use of the invention, the ability to generate or alter a motion recognizer can be incorporated into an end-user application In this case, not just the application developers, but also any users of the end-user application can generate their own recognizers from any combination of existing motions, their own new motions, or both. When the generated motion recognizer includes elements of previous motion recognizers, or is responsive to existing motions, the newly generated motion recognizer can be thought of as an alteration or modification of the previously existing motion recognizers.

The ability for users of an application to tune or generate their own motion recognizers is an enabling technology for a wide class of applications that, while possibly previously imagined, were not feasible.

Although many potential applications of motion recognition are known, the invention is an enabling technology for a wide class of applications.

BRIEF DESCRIPTION OF THE DRAWINGS

FIG. 1 shows the different components of a preferred embodiment in relation to one another;

FIG. 2 shows a process of classifying a new motion;

FIG. 3 shows a process of generating a new classifier in response to a set of labeled examples;

FIG. 4 shows a process of tuning a classifier;

FIG. 5 shows a typical setup that a developer might use when developing a console game; and FIG. 6 shows a setup for tuning a classifier.

DETAILED DESCRIPTION

Generality of the Description

This application should be read in the most general possible form. This includes, without limitation, the following:

References to specific structures or techniques include alternative and more general structures or techniques, especially when discussing aspects of the invention, or how the invention might be made or used.

References to "preferred" structures or techniques generally mean that the inventor(s) contemplate using those structures or techniques, and think they are best for the intended application. This does not exclude other structures or techniques for the invention, and does not mean that the preferred structures or techniques would necessarily be preferred in all circumstances.

References to first contemplated causes and effects for some implementations do not preclude other causes or effects that might occur in other implementations, even if completely contrary, where circumstances would indicate that the first contemplated causes and effects would not be as determinative of the structures or techniques to be selected for actual use.

References to first reasons for using particular structures or techniques do not preclude other reasons or other structures or techniques, even if completely contrary, where circumstances would indicate that the first reasons and structures or techniques are not as compelling. In general, the invention includes those other reasons or other structures or techniques, especially where circumstances indicate they would achieve the same effect or purpose as the first reasons or structures or techniques.

After reading this application, those skilled in the art would see the generality of this description.

DEFINITIONS

The general meaning of each of these following terms is intended to be illustrative and not in any way limiting.

Motion: The action or process of changing position. This includes intentional and meaningful motions, such as twisting ones wrist to simulate using a screwdriver, as well as unintentional motions, such as wobbling some people might exhibit when drunk.

Motion signal: A motion signal is information, such as time series data that describes some motion over a predefined time. The data can take many forms. For example, not intended to be limiting in any way, positions of an object over time, orientations of an object over time, accelerations experienced by an object over time, forces experienced by an object over time, data expressed in a frequency domain, data expressed in a parameterized domain such as $R^3$ or $R^4$, and the like. Motion signals are sometimes referred to as motions. As used herein, a motion signal might refer herein to a processed motion signal or a raw motion signal.

Processed motion signal: A processed motion signal is a motion signal that has been filtered or transformed in some way. For example, adaptively smoothing the signal or transforming the signal into a frequency domain using a Fourier or other transform. Processed motion signals are sometimes referred to herein as processed motions.

Raw motion signal: Is the unprocessed motion signal. Raw motion signals are sometimes referred to herein as motion signals.

Motion class: A motion class is a set of motions recognizable as distinct from other motion classes, such as a cluster of motions generally distinguishable from other such clusters. For example, not intended to be limiting in any way, there is a class of motions that correspond to waving. Any two waving motions could be quite different, but there is some group family resemblance that means they are both examples of the class of waving motions.

Unknown class: In any set of motion classes there is understood to be the class of "unknown" or "undetermined" motions. In these cases, the "unknown" class is used herein to refer to all motions that are not examples of one of the set of said known classes.

Motion label: A motion label includes a unique identifier for a motion class. For example, any motion that is deemed to be an example of the class of waving motions might be labeled "waving". Those skilled in the art would immediately recognize that some convenient synonym, such as an integer or enum in a programming language, could be used.

Labeled motion: A labeled motion includes a (raw or processed) motion signal that has been assigned a class label. During the training phase in which a classifier is generated, labels might be assigned by a human operator or other interface with domain knowledge of the motion signals. Labels can also be implicit in the sense that a set of motions grouped together in some way can sometimes be assumed to all examples of some motion. That is, they are implicitly labeled as positive examples of some motion that may or may not have some additional way of describing it.

Training set: A set of (raw or processed) motion signals used to generate a motion recognizer. There are a wide variety of possible forms a training set can take and many structures that a training set can have. For example, not intended to be limiting in any way, a collection of sets of motion classes, or a set of labeled motions, or a collection of unlabeled motions (implicitly assumed to be positive examples of some motion class).

Classification rate: A measure of motion recognizer performance responsive to a set of statistical measures, such as for example a number of false positives and false negatives.

Classification distance: If a set of motions is arranged in ascending order of distance to some particular motion, a classification distance for the particular motion is the distance to the first false positive in that set.

Classification: Includes assigning a class label to an unlabelled motion signal or prototype, including the possibility that the assigned class label might be "unknown", "undetermined", and the like. Classification might additionally assign probabilities, possibly in response to additional factors, that an unlabelled example is an example of each possible class, in which case the assigned label is the class with greatest likelihood.

Motion prototype: A motion prototype is a (raw or processed) motion signal that has been chosen to be a member of the set of representative motions for some class of motion signals. The number of prototypes that a motion recognizer or classifier can store is called the capacity of the motion recognizer or classifier.

Adaptive smoothing: Adaptive smoothing includes motion filtering techniques applied to a raw motion signal to generate a compressed representation, referred to herein as a processed motion signal.

In a preferred embodiment, the raw motion is split into segments and each segment is represented by the average value of the signal in that segment. The length of the segment is determined adaptively according to the magnitude of the underlying raw motion signal. In some embodiments, the length of the segment is proportional the signal magnitude so that the higher the magnitude, the shorter the segment—higher magnitude signals intuitively indicate more information content and hence the need for a higher sampling rate.

Motion recognizer: software instructions capable of being interpreted by a computing device to recognize classes of motions.

Gesture: A meaningful or expressive change in the position of the body or a part of the body. For example, not intended to be limiting in any way, waving, drawing a letter of the alphabet, trying to lasso a horse. Gestures include motions, but not all motions are necessarily gestures.

Classifier: As used herein, this term generally refers to software instructions capable of being interpreted by a computing device to perform classification. A classifier might also function by assigning probabilities that the possible class instance is an example of each possible class. A classifier might also be allowed to determine that a possible class instance is, in fact, not an instance of any known class.

Tuning: As used herein, tuning a classifier involves providing additional labeled examples of pre-existing motion classes. The purpose of tuning is to improve recognition rates, for example, to reduce the number of false positives or false negatives.

Game developer: Anyone involved in the creation of a video game. As used herein, this might include, but is not necessarily limited to, a game programmer, an AI programmer, a producer, a level designer, a tester, a hired contractor, an artist, a hired motion actor, and the like.

Console: One or more devices used for playing a video game. For example, not intended to be limiting in any way, one of the following: Playstation, PlayStation 2, Playstation 3, XBox, XBox 360, GameCube, Wii, PSP, Dual Screen, PC, Mac, Game Boy, any other device, such as a cell phone, that can be used for playing games.

Console development kit (or "development kit"): A console development kit is a version of one or more game consoles used by game developers to develop their games, that is, either a version of a single game console or a version capable of emulating different game consoles. It is ostensibly the same as the final console that the game will run on, but typically has additional features to help game development, such as file input and output, hookup to an integrated development environment hosted on another computer, and the like.

Host PC (or host computer): During game development on consoles, it is customary to have a console development kit attached to a host PC. For example, the compiler might run on a PC running a version of Microsoft Windows to generate an executable. The executable then gets run on the console by transferring it across some connection, such as a USB cable, to the console. Output from the console then appears on a TV screen, with the option to have printed messages (for debugging purposes) sent back to the host PC for display.

Development time: The time during which the game is developed, that is, before it ships to end-users. However, development may even continue after shipping, with the effect that upgrades and bug fixes might be released as patches.

Game time: The time when the game is being run, that is, played by an end-user.

The scope and spirit of the invention is not limited to any of these definitions, or to specific examples mentioned therein, but is intended to include the most general concepts embodied by these and other terms.

Developer Setup

FIG. 5 shows a typical setup 500 that a developer uses when developing a console game.

The console development kit 502 is almost the same as the console that the game will run on when it is finally shipped, but may have some additional features to assist development. The term console and console development kit can therefore be largely used interchangeably. The controller 504 is connected to the console development kit 502 by a wired or wireless connection. The controller is moved around by a human 505 who may be the game developer, or someone hired by the developer. The console development kit 502 can communicate with a host computer 501 that is usually a standard PC. The console 502 is also attached to a display device, such as a TV screen 503.

System Components

FIG. 1 shows different components of a preferred embodiment 100 in relation to one another.

lmMaker 102 is an application that runs on a host PC. lmRecorder 106 and lmCalibrator 107 are distributed as sample applications that can be compiled and run on the Nintendo Wii console development kit 105. The run time library 109 will be compiled and linked in with all applications that use LiveMove on the console (i.e., the game 108, lmCalibrator 107 and lmRecorder 106).

To create motion examples 103, the game developer runs lmRecorder 106. Then, as the developer, or someone hired by the developer, performs motions with the controller, the motions are recorded and saved to a disk (or some other suitable media) as motion examples 103.

lmRecorder 106 can also provide feedback on the motions generated to help the user of the motion input device obtain the examples being desired. Thus, only when a desired motion has been performed is it saved.

It shall be noted that lmRecorder 106 can alternatively be compiled into a developer's game 108 (or some other suitable application) as a library so that the collection of raw motions can be performed within the context of the game, if the developer so desires.

Another application called lmMaker runs on the host computer. The example motions 103 can be read in by lmMaker 102 running on the host PC 101 to create classifiers 104. In particular, the developer uses lmMaker 102 to select motions and assign corresponding labels to the classifiers. In addition, lmMaker provides additional summary information on the motions. For example, which orientation the motion device was being held, etc.

Once the classifiers 104 have been generated, they can then be read straight back in to lmMaker 102 for immediate testing. This allows for a very fast prototyping to maximize game developer creativity.

The classifiers 104 can also be loaded by console applications, such as the game 108 or lmCalibrator 107. On the console 105, the classifiers 104 can be used by the LievMove library 109 to classify new motions. They can also be tuned to improve their performance, which will be further detailed below with reference to FIG. 4.

Classifying New Motions

FIG. 2 shows a process 200 of classifying a new motion 202.

The raw motion signal is possibly filtered 203, for example, using adaptive smoothing, and then the time warp distance to the prototypes 204 stored in the classifier is computed. If no prototypes are within any prototype's classification distance 205, then the motion 202 is labeled as unknown or undetermined 206. If there is only one proto-type for which the motion 202 is within the prototype's classification distance, then the motion 202 is labeled with the label associated with the said prototype. If there is more than one candidate prototype 207, then the best prototype used to assign the label 210 is picked by majority vote, or is the one with the smallest distance 209. The game can use the label determined by the classifier to drive an animation, change the game-state, etc, Those skilled in the art would recognize that generated classifiers motion can be arranged in a hierarchy. For example, one set of classifiers may determine if a motion was a punch. Then, if additional information was required, a second set of classifiers could be called upon to determine if the punch was, say, an uppercut or a jab. This might be useful if there were circumstances in the game in which it was only necessary to determine the broad class of motion. In such cases, the additional work of determining more fine-grained information about the motion could be avoided.

Methods of Operation

FIG. 3 shows the process 300 of generating a new classifier 307 from a set of labeled examples 302.

In particular, a human operator of lmMaker 303 selects which examples to use to build a classifier. If necessary, the motion examples are smoothed and then the classification rates are calculated for each example to each other example 304. The examples with the best classification rates are selected as the prototypes 305. The selected prototypes are then used to create the classifiers 305 that are stored out to disk or some other persistent storage 307 for future use.

Those skilled in the art would recognize that it is straightforward to include the functionality of lmMaker in the run-time library. This would allow the game players to generate their own classifiers from scratch within the context of playing the game. The only challenge is, from a game design point of view, how to integrate the classifier generation process into the game. One implementation by the inventors would be in the context of a Simon Says game. One player performs some motions that are used as prototypes to generate a new classifier. And then another player tries to perform the same motion such that the said classifier successfully recognizes the said motion as an instance of the same motion type as the prototypes.

Setup for Tuning a Classifier

FIG. 6 shows the setup 600 for tuning a classifier.

The classifiers provided by the developer 603 are stored on disc, or can be downloaded over the network as downloadable content, and etc. These classifiers are then loaded by the game 606 that is running on the console 604. The players then use the wireless controllers 602 to perform their versions of the predefined moves 601. The run-time library 607 then uses the new example moves to tune the classifiers 603 to create versions tuned for individual users 605. The tuned classifiers 605 can then be saved out to a memory card or some other convenient storage medium.

Process for Tuning a Classifier

FIG. 4 shows the process 400 of tuning a classifier.

The classifiers are initially loaded 402 by an application (e.g., a game). Next a human tunes the classifier by providing labeled examples 403 that represent his/her interpretation of the motions the classifier already knows how to classify. The human can continue to provide new examples until he/she is happy with the classification performance or the application decides enough tuning has been completed. The new examples provided by the human will typically be smoothed 404 before trying to classify it. If the classifier determines the new example is too far from any stored prototype 405, it will simply reject the new example and the human will have to provide an alternative. If the prototype is acceptable and the classifier has enough capacity 406 to store the new example, then the example may be stored in the classifier as a new proto-type 407. The new classifier can then be saved out to a disk 408 or any other suitable storage media available locally or over the network.

Tuning could occur at development time to tweak an existing classifier. But at development time, the developer could just add the new motion prototypes to the previous set of prototypes and re-generate the classifier, as in FIG. 2. So the intended use of modifying a classifier is by the player after the game has been shipped. In particular, players who have purchased the game can add some of their own motion prototypes to the classifier. The inventors have discovered that this ability significantly boosts subsequent classification rates.

More generally, there is a chain of distribution between the developer and the end-user, and it might be desirable for one or more people in that chain (including, say,) to make modifications. For example, not intended to be limiting in any way, these could include parents with a security code, a value-added reseller, a consultant hired to tailor the game to a particular end-user, a retailer tailoring the game to a particular type of customer (such as expert tennis players versus small children).

The invention also obviously allows for some motions to be locked out, or to be released by the player achieving some skill level in the game.

System Elements

LiveMove

Nintendo will soon release a new games console called the Wii. One of the novel and interesting features of the Wii is the controller. In particular, the controller contains, among other things, accelerometers that can be used to record accelerations over time in three dimensions as a player moves the controller through space.

Game developers imagine many exciting new uses and games for the Wii and the associated controller. Many of those ideas revolve around being able to recognize which motions a player is performing. However, writing code to interpret the accelerometer data being relayed form the Wii controller is difficult. The problem is difficult because the same motion can be quite different when performed by different people, or even by the same person at different times. In addition the motion recording device might introduce measurement errors, or noise, that can make it harder to recognize a motion.

Game developers, using known techniques, have therefore struggled to bring their game ideas to market. The invention solves this problem by allowing game developers to create motion recognizers by simply providing examples of the motion to be recognized.

In a preferred embodiment, not intended to be limiting in any way, the invention is embodied in a commercially available product called LiveMove. LiveMove provides a video game with the ability to recognize any player's motions performed using the accelerometers in Nintendo's Wii remote controllers.

LiveMove Components libConsoleLM run-time library: Is a run-time library that is designed to be linked into the developer's game. Those skilled in the art would immediately recognize this as standard practice for using third party libraries.

libConsoleLM header files: Define the LiveMove API that the developer can use to insert calls to the libConsoleLM run-time library into their game source code. Those skilled in the art would immediately recognize this as standard practice for using third party libraries.

lmRecorder application: Is an application that runs on the Wii development kit that records data from the Wii controllers onto the hard drive of a standard PC (the host PC) that is connected to the development kit. Those skilled in the art would immediately recognize this as a standard approach to saving out data created on the Wii development kit.

lmMaker (Live Move classifier maker) application: Is an application that runs on a standard PC (the host PC) which is used to create motion prototypes and motion classifiers.

One embodiment of the invention includes the LiveMove run-time library called libConsoleLM, a classifier generation application called lmMaker (Live Move classifier maker) and a motion recorder application called lmRecorder. To use the invention, game developers will insert calls to the libConsoleLM run-time library API into their own code. Then the developer will compile and link the libConsoleLM with their game code (and any additional libraries they happen to be using). In contrast, a developer will only use lmMaker and lmRecorder at development time.

Methods of Operation

The steps that a game developer might typically follow to use LiveMove are listed below. In practice, any given set of developers may choose to skip some of the steps, repeat a step until some criteria are met, iterate over some subset of steps until some criteria are met, or perform some steps in a different order.

Motion Design Step: As part of the game design process, a game developer will typically decide upon a set of motions that they want the player to be able to perform in the game.

Motion Creation Step: Using lmRecorder, the Wii development kit and the controller, a game developer records a set of example raw motions for each motion that they want the player to be able to perform in the game. Recording the motions simply involves using the controller to perform a motion and choosing which motions to save on the host PC disk. The recorded motion signal is simply a sequence of numbers that represent the X, Y, Z accelerations of the Wii controller, that has an associated label to specify which motion it is an example of.

Processed Motion Creation Step: Processed motions are created by adaptively smoothing the raw motions. They are simply a compressed version of the raw motions that are convenient, easier and faster to work with. The processed motion can optionally contain the raw motion from which it was created. Raw and processed motions will sometimes be referred to simply as motions.

Motion Classifier Creation Step: Using lmMaker a game developer will select which set of labeled example motions to use to create a classifier. The set of selected examples is sometimes referred to as a training set. Once a classifier is created it is saved onto the disk of the host PC.

To generate a classifier each example motion is examined in turn. To each of these motions, the time warped distance is computed to each of the other motions. Where the time warped distance used is roughly the same as the one described in 1.

As each motion is examined in turn, if it is within some prespecified distance of another motion, then it is classified as an instance of that other motion. For each motion, we therefore end up with a classification of all the other motions. By comparing the assigned classification with the actual class label, the classification rate can be determined, where the classification rate is a measure of the number of false positives versus the number of false negatives. All the motions can thus be ranked according to their respective classification rates. The top n classifiers are chosen to be prototypes for the class, where n is an integer number, e.g., 1, 2, 3, 4 . . . .

The generation of classifiers has a number of tunable parameters, such as the classification rate, that must be set in advance. Currently, the inventors have assigned these values, but those skilled in the art would quickly realize that expert users could easily be given access to these settings so that they can experiment for themselves.

libConsoleLM Incorporation Step: A game developer will insert the required API calls into their code by including the libConsoleLM header files and making calls to the functions contained therein, and link in the libConsoleLM run-time library. Those skilled in the art would immediately recognize this as standard practice for using third party libraries.

Game Shipping Step: As part of the usual process of shipping a game, a developer will store a compiled version of the game source code onto some media so that they accessible to the game during game play. Not intended to be limiting in any way, examples include saving the classifiers on DVD, memory cards, or servers accessible over some network.

The game will incorporate the libConsoleLM run-time library. The created classifier will also be distributed along with the game. From the developer's point of view, the classifier is one of the game's assets. Other more commonplace assets include sound files, texture maps, 3D models, etc. Those skilled in the art would immediately recognize this as standard practice for shipping games that depend on various assets.

Game Playing Step: When the player starts playing the game that they have purchased or otherwise acquired the game will execute the sequence of steps it has been programmed to execute in response to the player's actions. When the player starts the game, or reaches some otherwise convenient point in the game (such as a new level), the game will load in one of the previously generated classifiers.

As the player plays the game and performs motions with the Wii controller, the game supplies the motions to the libConsoleLM run-time library through the preprogrammed calls to the libConsoleLM run-time library. The libConsoleLM runtime library is also called by the game code to ask which motion the player has performed and the libConsoleLM run-time library will return, in real-time or close to real-time, a label indicating which motion, if any, the player's input data corresponds to. To make the determination the libConsoleLM runtime library uses its own internal logic and one of the classifiers it has access to.

In particular, time warping is used to compare the distance between the supplied motion and one of the stored prototypes. If a proto-type is within its classification distance to the supplied motion, then that prototype is used to determine which class the supplied motion belongs to. Conflicts are typically resolved by majority vote, or some measure based upon the distance. If the supplied motion is not within the classification distance of any prototype, the supplied motion's class is said to be undetermined. That is, the supplied motion is deemed to not be an example of any known class.

The invention extends the known techniques described in 1 by inventing an incremental version. In particular, the incremental version can return the most likely classification before it has seen the entire motion signal. When only a small amount of the signal has been seen there maybe several likely candidates, but the inventors have discovered that it is often the case that, well before the end of the motion signal, there is only one likely remaining candidate. This is an important enabling invention for games where the latency in known approaches could result in annoying pauses.

In the preferred embodiment, there is a recommended tuning step a new player can perform before beginning to play the game in earnest. It is also recommended that the player repeat the tuning step whenever the recognition rates decline. For example, because the player is performing motions differently due to practice, tiredness, etc.

Whether the tuning step is undertaken is ultimately in the control of the game developer and the player. But the inventors have discovered that recognition rates are significantly boosted if a classifier can be modified to include prototypes from the player whose motions are to be recognized.

It is up to the game developer as to how they incorporate the tuning step into their game. The only constraint is that the classifier be provided with new labeled examples of known motion classes. A simple example of how the tuning step might be performed is to have the player follow instructions to perform a predetermined set of motions. That way the classifier knows to which class of motions the supplied motion is mean to belong.

Of course, all motion signals are again adaptively smoothed in order to compress them and make them easier to compare and manage.

If the candidate tuning example is too dissimilar from the known prototypes, it will typically be rejected and the player is expected to modify their behavior to more accurately perform the desired motion. In this way, the player is disallowed from generating de facto new recognizers. In particular, the ability to allow players to generate their own recognizers is only available for an additional licensing fee.

If the candidate tuning example is deemed suitable, it will be used to augment or replace one of the classifier's existing set of prototypes. Augmentation is preferable, but if the classifier has reached its capacity, for example, due to memory constraints, one of the existing prototypes must be discarded.

Additional details and advice on using LiveMove can be found in the incorporated disclosure, the LiveMove manual.

Generality of the Invention

This invention should be read in the most general possible form. This includes, without limitation, the following possibilities included within the scope of, or enabled by, the invention.

In one set of embodiments, extensions of the invention might allow players to generate their own motion recognizers from scratch. This might be performed by re-compiling the libConsoleLM runtime library to incorporate the code used in lmMaker to generate classifiers.

In one set of embodiments, extensions of the invention might enable a completely new class of games. For example, a team-based Simon Says game, that is, a synchronized motions game in which a team of players competes against another team of players, each with a controller in hand. The prototype motion is the captured data of all of the first teams' motion data over time. The opposing team has to mimic the motion. The contest would be like a sporting event: the synchronized motion Olympics.

The invention might be used to help people who are severely disabled but still have gross-motor control (but not fine-control). In particular, they could then type via the motion recognition interface. The ability to define your own motions means that they can settle on motions that are easy and comfortable for them to perform.

After reading this application, those skilled in the art would see the generality of this application.

TECHNICAL APPENDIX

This application includes the following technical appendix. This document forms a part of this disclosure, and is hereby incorporated by reference as if fully set forth herein.

The LiveMove user manual. The user manual is written for game developers who want to use LiveMove in their game. Among other things, it explains how to use the development tools to generate motion classifiers and describes the libConsoleLM run-time library API.

REFERENCES

This application includes the following references. Each of these documents forms a part of this disclosure, and is hereby incorporated by reference as if fully set forth herein.

1 E. Keogh and M. Pazzani, Derivative Dynamic Time Warping, in First SIAM International Conference on Data Mining, (Chicago, Ill., 2001).

2 Lawrence R. Rabiner, A Tutorial on Hidden Markov Models and Selected Applications in Speech Recognition. Proceedings of the IEEE, 77 (2), p. 257-286, February 1989.

What is claimed is:

1. A system for recognizing motions, the system comprising:

a computing unit configured to include one or more motion recognizer generators that generate a set of motion recognizers for use in video games in response to a first training set of first motion signals; and at least one first handheld motion-sensitive device generating the first training set of first motion signals when the first handheld motion-sensitive device is being manipulated by a trainer, each of the first motion signals describing a motion of the first handheld motion-sensitive device over a period of time, each of the motion recognizers configured to generate a motion recognition signal in response to a second motion signal from a second handheld motion-sensitive device, wherein the computing unit is configured to tune the motion recognizers in response to one or more of a second set of motion signals generated from the second handheld motion-sensitive device when the second handheld motion-sensitive device is manipulated by an end user, each of the second set of motion signals describing at least one motion of the second handheld motion-sensitive device over a period of time.

2. The system as recited in claim 1, wherein a time warp distance is calculated from the second motion signal to one or more motion prototypes stored in one or more of the motion recognizers to determine a subset of the prototypes when the time warp distance is below a predefined distance threshold, and wherein motion recognition of the second handheld motion-sensitive device is responsive to the subset of the prototypes.

3. The system as recited in claim 1, wherein the second motion signal is an actual motion signal from the second handheld motion-sensitive device used to interact with a game integrated with some or all of the motion recognizers.

4. The system as recited in claim 1, wherein at least one of the motion recognizers generated in response to the first training set of motion signals includes a generalized version of one or more of the first motion signals is a prototype, to which classification will be responsive.

5. The system as recited in claim 3, wherein the second motion signal or one or more of the second set of motion signals is used to tune one or more motions from the training set into a generalized version of the one or more motions from the training set.

6. The system as recited in claim 1, wherein at least one of the motion recognizers generates a recognition signal in response to a prefix of the second motion signal, when a time warp distance calculated from the prefix of the second motion signal to one or more motion prototypes stored in a classifier is compared to a modified distance threshold, leading to an effect of providing relatively low latency incremental motion recognition.

7. The system as recited in claim 1, 2, 3, or 6, wherein, one or more of the first motion signals in the training set represent one or more motions performed by one or more people involved in game development, the second motion signal or one of the second set of motion signals represents one or more motions performed by one or more game players, one or more of the motion recognizers are coupled to a game and are used to classify the second motion, one or more resulting classifications are coupled to events in the game.

8. The system as recited in claim 1, wherein the first training set of motion signals are a set of raw motion signals, each describing one or more motions of the first handheld motion-sensitive device.

9. The system as recited in claim 8, wherein the computing unit is configured to include a component to process the raw motion signals to filter out undesired effect therein.

10. The system as recited in claim 9, wherein the processing of the raw motion signals includes compressing: the raw motion signals, adaptively sampling the raw motion signals, modifying the raw motion signals to make the raw motion signals more similar to one or more previously observed motions, or filtering the raw motion signals in order to make the raw motion signals easier to store or recognize.

11. The system as recited in claim 8, wherein the raw motion signals are generated in, besides the first handheld motion-sensitive device, one or more input devices responsive to one or more humans, animals or machines, an output of executed program code, the raw motion signals generated at different locations, dates and times stored on storage media and made available locally or over a network.

12. The system as recited in claim 8, wherein the raw motion signals are generated in one or more input devices that include one or more accelerometers and transmit the raw motion signals wirelessly to the computing unit configured to execute an end user application.

13. The system as recited in claim 12, wherein one of the input devices is a controller handheld and moved around manually.

14. The system as recited in claim 4, wherein the computing unit is configured to include a motion recognizer tuner that modifies a previously generated motion recognizer in response to an additional training set.

15. The system as recited in claim 14, wherein the motion recognizer tuner tunes one or more of the motion recognizers to make them more responsive to one or more motions included in the additional training set, with an effect of improving recognition performance on the second motion signals generated from a substantially similar source as the additional training set.

16. The system as recited in claim 15, wherein the additional training set includes one or more motions that represent motions of a celebrity; and the resulting tuned recognizer corresponds to a motion recognizer henceforth associated with the celebrity.

17. The system as recited in claim 15, wherein the motion recognizer tuner tunes one or more of the first motion signals, and provides representative prototypes in place of or in addition to one or more of the prototypes corresponding to one or more of the motion recognizers being tuned.

18. The system as recited in claim 14, wherein the additional training set is responsive to feedback from at least one earlier collected motion, with an effect of tuning the motion recognizers accordingly.

19. The system as recited in claim 14, wherein the motion recognizer tuner is capable of performing at least one of the following:
  causing the motion recognizers to be responsive to the additional training set, removing the motion recognizers, and
  merging the motion recognizers.

20. The system as recited in claim 1, wherein one or more of the motion recognizers generate motion recognition signals for one or more new motion signals in response to an incremental distance comparison to potential representative prototypes.

21. The system as recited in claim 1 further comprising:
  memory or mass storage coupled to the computing unit, wherein the memory or mass storage is accessible by another computing device for use of the generated motion recognizers therein.

22. The system as recited in claim 1, wherein
  one or more of the motion recognizer generators are sent over a network for use on another computing device.

23. The system as recited in claim 22, wherein the motion recognition signal includes a class label to identify a particular motion generated from the second handheld motion-sensitive device.

24. The system as recited in claim 23, wherein the motion recognition signal includes a list of class labels ranked in response to a measure of relative likelihood that one of the second set of motion signals is a member of a class.

25. The system as recited in claim 23, wherein the motion recognition signal includes at least one response indicating that none of the motion recognizers recognize the second motion signal or one of the second set of motion signals.

26. The system as recited in claim 1, wherein the motion recognition signal is a sequence of numbers that represent X, Y, Z accelerations of the second handheld motion-sensitive device.

27. The system as recited in claim 2, wherein, as the second handheld motion-sensitive device is caused to move around, the second set of motion signals result in a plurality of motions ranked according to respective classification rates.

28. The system as recited in claim 26, wherein the motion recognizer generators create the motion recognizers in varying capacity.

29. The system as recited in claim 1 further comprising:
  a coupled application being executed in another computing unit, wherein one or more end users of the application are able to redefine one or more of the motion recognizers in response to either a new training set or a modified existing training set.

30. The system as recited in claim 29, wherein
  the coupled application includes a game played by one or more game players with one or more controllers generating various motion signals,
  the second motion signal or one of the second set of motion signals represents one or more motions performed by the one or more game players,
  one or more of the motion recognizers are used to classify one or more motions performed by the one or more players, and
  one or more resulting classifications are coupled to events in the game.

31. The system as recited in claim 30, wherein the motion recognizers generated in response to the first training set of motion signals represent motions of a first set of players which are used to recognize motions generated by a different set of players, with an effect that the game is responsive to one or more of the different sets of players mimicking one or more of the motions of the first set of players.

32. The system as recited in claim 29, wherein,
  one or more of the second set of motion signals represent one or more motions performed by one or more disabled people,
  one or more of the motion recognizers are coupled to an application to learn a correspondence between motions a disabled person is able to perform and a meaning associated with those motions, and
  one or more of the motion recognizers are used to classify one or more of the motions performed by the disabled users of the application.

33. The system as recited in claim 1, wherein one or more of the generated motion recognizers are coupled to a training program designed to guide, or help, or teach people to learn a physical skill.

34. The system as recited in claim 1, wherein one or more of the generated motion recognizers are coupled to an animal behavior monitoring application.

35. The system as recited in claim 1, wherein one or more of the generated motion recognizers are coupled to a law enforcement monitoring application.

36. The system as recited in claim 1, wherein one or more of the motion recognizers provide feedback in response to a measure of comparison between possibley new motions and a set of motions used to generate or tune the motion recognizers.

37. A method for recognizing motions, the method comprising:
generating a set of motion recognizers for use in videogames in response to a first training set of first motion signals; and
associating each of the motion recognizers with one or more of the first motion signals, wherein each of the first set of motion signals describes a motion of a trainer manipulating at least one first handheld motion-sensitive device over a period of time; and
generating for each of the motion recognizers a motion recognition signal in a computing unit in response to a second motion signal from a second handheld motion-sensitive device;
generating a second set of motion signals from the second handheld motion-sensitive device when the second handheld motion-sensitive device is manipulated by an end user, wherein each of the second set of motion signals describes at least one motion of the second handheld motion-sensitive device over a period of time; and
tuning the motion recognizers in response to one or more of the second set of motion signals.

38. The method as recited in claim 37, wherein a time warp distance is calculated from the second motion signal to one ore more motion prototypes stored in one or more of the motion recognizers to determine a subset of the prototypes when the time warp distance is below a predefined distance threshold, and wherein motion recognition of the second handheld motion-sensitive device is responsive to the subset of the prototypes.

39. The method as recited in claim 37, wherein the computing unit is configured to determine, for at least one of the motion recognizers, a set of motion prototypes that are representative of the first motion signals associated with the at least one of the motion recognizers.

40. The method as recited in claim 37, wherein at least one of the motion recognizers generates a recognition signal in response to a prefix of the second motion signal, when a time warp distance calculated from the second motion signal to one or more motion prototypes stored in a motion recognizer is compared to a modified distance threshold, leading to an effect of providing relatively low latency incremental motion recognition.

41. The method as recited in claim 37, wherein the first training set of first motion signals are a set of raw motion signals, each describing one or more motions of the first handheld motion-sensitive device.

42. The method as recited in claim 41, further comprising: processing the raw motion signals from motion sensors enclosed in the first handheld motion-sensitive device being manipulated by a trainer.

43. The method as recited in claim 42, wherein said processing of the raw motion signals includes
adaptively sampling the raw motion signals
with an effect of making the raw motion signals easier to be stored or recognized.

44. The method as recited in claim 38 further comprising: tuning one of the previously generated motion recognizers in response to an additional training set.

45. The method as recited in claim 44, wherein the turning of the previously generated motion recognizer is performed by a motion recognizer tuner that tunes one or more of the motion recognizers to make them more responsive to one or more motions included in the additional training set, resulting in an effect of improving recognition performance on motion signals subsequently generated from a substantially similar source as the additional training set.

46. The method as recited in claim 44, wherein said tuning of the previously generated motion recognizer includes: selecting one or more of the motion signals from the additional training set as representative prototypes in place of or in addition to one or more of the prototypes in one or more of the motion recognizers being tuned.

47. The method as recited in claim 44, further comprising: capturing motions responsive to feedback from an entity involved in collecting the motions, with an effect of tuning the motion recognizers to be either more specific or less specific.

48. The method as recited in claim 45, wherein the motion recognizer tuner performs at least one of operations:
adding new motion recognizers responsive to the additional training set;
removing the motion recognizers; or
merging the motion recognizers.

49. The method as recited in claim 38, wherein one or more motion recognizers perform calculating an incremental measure of distance comparison between one or more new motion signals and potential representative prototypes.

50. The method as recited in claim 37 including: saving one or more of the motion recognizers in a storage medium; and making the generated motion recognizers available for use on another computing device.

51. The method as recited in claim 37, including: sending one or more of the generated motion recognizers over a network for use on one or more other computing devices.

52. The method as recited in claim 51 including: computing a class label as a recognition signal for the second motion signal.

53. The method as recited in claim 52 including:
computing a list of possible class labels ranked by a measure of relative likelihood that the second motion signal is a member of a class.

54. The method as recited in claim 37, wherein the second motion signal is a sequence of numbers that represent X, Y, Z accelerations of the second handheld motion-sensitive device and further including:
determining if one of the motion recognizers does not satisfactorily recognize the motion signal.

55. The method as recited in claim 54, wherein as the second handheld motion-sensitive device is caused to move around, the second motion signal results in a plurality of motions ranked according to respective classification rates.

56. The method as recited in claim 37, wherein as the second handheld motion-sensitive device is caused to move around, the second motion signal results in a plurality of motions ranked according to respective classification rates.

57. The method as recited in claim 37 including specifying a capacity for each of the generated motion recognizers.

58. The method as recited in claim 37 including coupling an application, wherein one or more end users of the application are able to redefine one or more of the motion recognizers in response to a new training set of motion signals or a modified existing training set of motion signals.

59. The method as recited in claim 58, including:

generating the motion recognizers in response to one or more of the motion signals in the new training set or the modified existing training set created by the end user.

60. The method as recited in claim 58, wherein Wherein the one or more end users are physically challenged.

61. The method as recited in claim 37 including:

generating the motion recognizers in response to one or more of the motion signals in a training set representing one or more motions performed by teachers possessing some physical skills, with the effect that one or more students can attempt to learn that same or similar physical skill by attempting to have their motions correctly classified by those motion recognizers.

62. The method as recited in claim 37 including:

generating the motion recognizers in response to one or more of the motion signals in a training set representing one or more behaviors performed by animals.

63. The method as recited in claim 62 including:

performing behavior modification on at least one of those animals in response to an output of one or more of the motion recognizers.

64. The method as recited in claim 37 including:

generating the motion recognizers representing one or more behaviors performed by people, wherein the behaviors are prescribed or proscribed.

65. The method as recited in claim 64 including:

monitoring one or more persons for these behaviors that are prescribed or proscribed.

66. The method as recited in claim 37, further comprising providing feedback that includes at least one measure of similarity or difference, on how sets of motions compare to motions earlier used to generate or tune the motion recognizers.

* * * * *